United States Patent [19]

Murata et al.

[11] B 3,981,735

[45] Sept. 21, 1976

[54] PROCESS FOR MAKING A STABLE, RELATIVELY HIGH CONCENTRATION, SOLUTION OF AN ORGANIC COLOR-REACTIVE COLORLESS DYE IN OIL

[75] Inventors: Minoru Murata; Koichi Sugiyama, both of Hiratsuka; Hisao Ikeda, Fujisawa, all of Japan

[73] Assignee: NCR Corporation, Dayton, Ohio

[22] Filed: Mar. 20, 1974

[21] Appl. No.: 452,883

[44] Published under the second Trial Voluntary Protest Program on January 27, 1976 as document No. B 452,883.

[30] Foreign Application Priority Data

Apr. 16, 1973 Japan................................ 48-43005

[52] U.S. Cl.................................. 106/27; 106/253
[51] Int. Cl.²......................................... C09D 11/06
[58] Field of Search ................. 106/253, 20, 21, 27; 260/406; 117/36.8, 362

[56] References Cited

UNITED STATES PATENTS

| | | | |
|---|---|---|---|
| 2,755,202 | 7/1956 | Balon.................................. | 117/36.2 |
| 2,755,203 | 7/1956 | Stallmann.......................... | 117/36.2 |
| 3,447,944 | 6/1969 | Werner............................... | 117/36.8 |
| 3,653,945 | 4/1972 | Davis.................................. | 117/36.8 |

*Primary Examiner*—Theodore Morris
*Attorney, Agent, or Firm*—Robert J. Shafer; E. Frank McKinney

[57] ABSTRACT

A process is disclosed for dissolving an organic color-reactive colorless dye in a high concentration in an oil and simultaneously stabilizing the solution therefrom, characterized by acting an organic peroxide on said dye.

11 Claims, No Drawings

PROCESS FOR MAKING A STABLE, RELATIVELY HIGH CONCENTRATION, SOLUTION OF AN ORGANIC COLOR-REACTIVE COLORLESS DYE IN OIL

DETAILED EXPLANATION OF INVENTION

The present invention relates to a process for dissolving an organic color-reactive colorless dye in a high concentration in a mineral oil or, preferably, a vegetable oil to make a stable solution therefrom in which said organic dye is normally relatively insoluble and unstable in the oil.

For purposes of this invention, and as used herein, a "stable" solution is a solution wherein the solute remains dissolved over a long period of time and does not recrystallize or precipitate to yield a dispersion.

While aromatic oils or halogenated oils have been used as solvents for stably dissolving color-reactive colorless dyes, these oils have undesirable toxicity properties and are inconvenient to use under some conditions. That is to say, when an ink made by dissolving a dye in an aromatic oil or a halogentated oil is used in an ink feeder made from a continuously foamed spongy rubber, of a kind which is employed in many printing systems, the spongerubber component becomes swollen and inoperative. Further, the toxic nature of the oils sometimes presents restrictions in their use.

As a result of studies directed toward overcoming these problems, the present invention has been attained.

As solvents useful in the present invention, there are preferably eligible substantially water insoluble vegetable oils and mineral oils of a straight chain, organic, structure, low vapor pressure, and high boiling temperature. Such oils do not normally dissolve an appreciable amount of color-reactive colorless dyes as compared with aromatic oils and halogenated oils. The present invention is concerned with making stable dye solutions of relatively high concentration in these oils. While there are disadvantages in the use of aromatic or halogenated oils as solvent for the dyes disclosed herein, it should be pointed out that the present process practiced on substantially water insoluble aromatic or halogenated oily solvents also results in stable solutions of higher dye concentration than would be possible without the process.

An object of the present invention is to provide a process for preventing a color-reactive dye from crystallization and precipitation by effective use of free radicals produced from an organic peroxide as the free radicals act on said dye. A more specific object is to provide a process for making a stable solution of color-reactive dye in oil at higher concentration than previously possible.

As an example, using an amino-substituted fluoran disclosed in U.S. Pat. No. 3,681,390 as a color-reactive, colorless dye and benzoyl peroxide as an organic peroxide, the present understanding of the reaction mechanism in this invention will be explained. The reaction mechanism is not completely understood and; although such is not strictly required, explanation of the inventors' best present understanding may be helpful for appreciation of the invention.

Benzoyl peroxide $(C_6H_5COO)_2$ is primarily and secondarily decomposed by heat as follows:

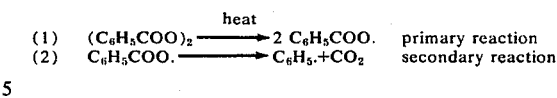

It is assumed in the present invention that the benzoyloxy radical $(C_6H_5COO\cdot)$ produced in the primary reaction is attached, by being complexed, to the fluoran molecule, as shown in the following, to improve solubility of the dye to which said radical is attached and to simultaneously stablize any solution in oil.

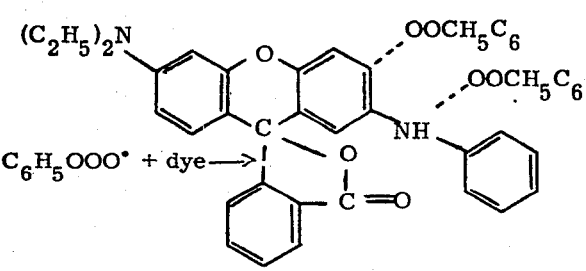

The above is an example of reaction between benzoyl peroxide and 7-anilino-3-diethylaminofluoran to yield a complex. However, since a color-reactive colorless dye has generally an optimal property as an acceptor for free radical, such a reaction similarly takes place not only in the above, exemplary, dye, but also in other color-reactive colorless dyes.

Oils eligible for use in the present invention include castor oil, linseed oil, tung oil and coconut oil.

Further, as color-reactive dyes, eligible examples include crystal violet lactone, benzoyl leuco methylene blue, 2-methyl-6-isopropylaminofluoran and N-phenyl-leucauramine, any of which may be dissolved to advantage in accordance with the present process. Color-reactive dyes, in general, are eligible for use in this invention. Classes of such dyes include phthalide dyes, fluorans, phenyl phenothiazines, leucauramines, and the like.

Organic peroxides eligible to be used in the present invention include benzoyl peroxide, acetyl peroxide, naphthoyl peroxide, lauroyl peroxide, 2,5-dimethylhexane-2,5-di-(peroxylbenzoate), 2,5-dimethyl-2,5-di-(tertiarybutylperoxy)hexane, dicumyl peroxide, 2,4-dichlorodibenzoyl peroxide, and the like.

The following Table provides a comparison of the stability of a solution to which the present process is applied and the stability of a solution from which the peroxide is omitted and to which the present process is not applied.

| Present process | Dry | 1 | 3 | After Days 10 | 30 | 60 | 90 | 120 |
|---|---|---|---|---|---|---|---|---|
| applied not | CVL | — | — | — | — | — | — | — |

-continued

| Present process | Dry | 1 | 3 | 10 | After 30 | Days 60 | 90 | 120 |
|---|---|---|---|---|---|---|---|---|
| applied | CVL | − | − | + | / | / | / | / |
| applied | fluoran | − | − | − | − | − | − | − |
| not applied | fluoran | − | + | / | / | / | / | / |

In test solutions shown in the above Table, 5 percent, by weight, of a dye was dissolved in castor oil. Benzoyl peroxide was used as an organic peroxide for practice of the process. In the Table, "CVL" signifies crystal violet lactone, "fluoran" signifies 7-anilino-3-diethylaminofluoran, "−" signifies a stable solution of the dye, "+" signifies precipitation or crystallization of the dye, and "/" signifies discontinuance of the test. The temperature of the test conditions was room temperature—about 20°–22° centigrade.

As is apparent from the Table, the color-reactive colorless dye in solution prepared by the present process has solution stability conspicuously superior to that of the solution from which the peroxide was omitted and to which the present process was not applied. Color-reactive colorless dye solutions to which the present process is applied are stable at concentrations even in excess of 10 percent.

Although, in its preferred embodiments, the present invention relates to a process for the preparation of a stabilized and concentrated solution of a color-reactive colorless dye in an oil, an excellent colorless ink can be prepared which develops a deep color when used in a pressure-sensitive color-reactive copying paper. A preferred method for using such a colorless ink is by containing the ink in microcapsules to be coated onto a substrate sheet;—subsequent capsule rupture providing the feature of pressure sensitivity.

Printing inks of the prior art which comprise a pigment or a dye dissolved or dispersed in an oil, leave smears and smudges of color on clothes and hands when they are accidentally spilled or contacted and, particularly in the case of a black ink, the resulting smudge marks cannot easily be removed because of the carbon content. To the contrary, since the chromogenic ink prepared by practice of the present invention is colorless and does not color when contacted by clothes and hands, said ink is advantageously used in printing methods where it is desired or required to eliminate soiling clothes and hands. That is to say, said ink is especially eligible for use in an automatic ticket server or the printing system of a computer.

Sheets on which the ink of this invention is printed are coated in an adequate amount with a sensitizing agent of a combination of materials such as kaolin, Japanese acid clay, bentonite, attapulgite, Silton clay, activated clay, silica and aluminum oxide or a mixture thereof with a polymeric binder such as gelatin, starch, gum arabic, poly(vinyl alcohol), or some latex of copolymers such as of ethylene and vinyl acetate (these papers are referred to hereinbelow as processed papers). When the chromogenic colorless ink is printed on said processed paper by means of a roll (including a spongy roll), type (made of rubber or metal) or spongy rubber type which is coated or impregnated with said ink, letters or patterns are instantaneously developed and printed on said paper.

The above-named clay materials are effective to cause coloration of the color-reactive colorless dye by virtue of their activity as Lewis acids (electron acceptors). Other Lewis acid clay or pigment materials are eligible for use on the coated sheets; and, as a substitute for the clay or pigment materials, acidic polymeric materials can be used. Among polymeric materials which will cause coloration are: phenolic polymers, phenol acetylene polymers, maleic acid-rosin resins and maleic anhydride copolymers such as those with styrene, ethylene, and vinylmethylether.

DESCRIPTION OF PREFERRED EMBODIMENTS

EXAMPLE 1

15 grams of 7-anilino-3-diethylaminofluoran were dissolved in 100 grams of castor oil at about 130° centigrade. The temperature of the solution was lowered to 90° centigrade and a mixed dispersion of 2 grams of castor oil and 2 grams of benzoyl peroxide was added to the resulting solution and dissolved therein with stirring at high speed. Then, the solution was heated to 150° centigrade, maintained at said temperature for about 30 minutes and then gradually cooled to room temperature.

The thus obtained color-reactive colorless dye solution was stable and contained more than 12 percent, by weight, dye material.

EXAMPLE 2

15 grams of crystal violet lactone (referred to hereinbelow as CVL) was dissolved in 100 grams of castor oil at about 130° centigrade. The solution was then cooled to 100° centigrade and 2 grams of 2,5-dimethylhexane-2,5-di-(peroxylbenzoate) was added to the solution. The resulting solution was again heated to 150° centigrade to react for about 30 minutes and then gradually cooled to room temperature.

The solution obtained contained more than 12 percent, by weight, of color-reactive colorless dye and exhibited a high stability without precipitating.

EXAMPLE 3

10 grams of castor oil was heated to 130° centigrade and 0.6 grams of 7-anilino-3-diethylaminofluoran, 0.2 grams of CVL, and 0.3 grams of a green color-reactive fluoran dye were added to the oil and dissolved with stirring. The solution was then maintained at about 90° centigrade and 0.1 grams of benzoyl peroxide, dispersed in about 0.1 gram of castor oil, was added thereto and dissolved with stirring. The temperature of the mixture was raised to about 150° centigrade, the stirring was continued, and the mixture was maintained at that temperature for about 30 minutes. Then, 0.1 grams of a polyvinyl butyral resin was dissolved in the solution to modify the viscosity and the solution was gradually cooled to room temperature.

The obtained solution was stable and the solution, printed on a processed paper, gave a deep black print.

EXAMPLE 4

5.0 grams of castor oil and 5.0 grams of linseed oil were heated to 130° centigrade and 0.9 grams of CVL and 0.1 grams of benzoyl leuco methylene blue were mixed therein to dissolve. The solution was then cooled to 100° centigrade and 0.1 grams of 2,5-dimethylhexane-2,5-di-(peroxylbenzoate) was mixed to the solution to dissolve with stirring. The solution was again heated to 150° centigrade, maintained at said temperature for 30 minutes, then 0.1 grams of polyvinyl butyral resin was dissolved in the solution to modify the viscosity and the solution was gradually cooled to room temperature.

The solution obtained was stable and the solution, printed on a processed paper, gave a deep blue print.

EXAMPLE 5

4.2 grams of castor oil was heated to 130° centigrade and 0.9 grams of CVL was dissolved therein. Then, 0.2 grams of a mixture of equal parts of benzoyl peroxide and dioctyl phthalate was added to the solution, maintained at about 90° centigrade. The temperature of the mixture was raised to about 130° centigrade, the stirring was continued, and the mixture was maintained at that temperature for about 30 minutes. The mixture was gradually cooled to room temperature. The resulting solution was dissolved in 15.0 grams of a mixed liquid of 30 weight parts of a diaryl ethane and 70 weight parts of kerosene. The diaryl ethane can be dimethyl-substituted diphenyl ethane.

The solution obtained was stable and developed instantaneously in blue on a processed paper. The above examples demonstrate that a color-reactive colorless dye can be dissolved in an amount of several percent in a mineral oil such as kerosene whereas, such has not heretofore been possible. Thus, dye solutions obtained in accordance with the present invention are effective as pressuresensitive copying ink compositions as well as being useful as printing inks.

What is claimed is:

1. A stable, colorless, liquid ink composition comprising an organic peroxide compound dissolved in substantially water insoluble organic oil and complexed with a color reactive dye material.

2. The composition of claim 1 wherein the color reactive dye material is selected from the group consisting of colorless phthalide dyes, fluorans, phenyl phenothiazines and leucauramines.

3. The composition of claim 1 wherein the oil is selected from the group consisting of castor oil, linseed oil, tung oil and coconut oil.

4. A composition comprising a liquid solution of a solvent of substantially water insoluble organic oil and a solute of a color reactive dye material complexed with an organic peroxide compound.

5. A process for manufacturing a stable, colorless, liquid ink composition comprising the steps of:
   a. providing an organic oil;
   b. dissolving a color reactive dye material in the oil;
   c. reacting an organic peroxide compound with the color reactive dye material by:
      i. adding the peroxide to the solution with agitation and
      ii. maintaining the agitation until reaction is complete.

6. The process of claim 5 wherein the oil is heated to a temperature between 20° and 150° centigrade, color reactive dye material is dissolved in the heated oil in an amount which exceeds the maximum amount soluble at room temperature, and the peroxide is reacted with the dye material at a temperature above room temperature.

7. The process of claim 5 wherein the color reactive dye material is selected from the group consisting of colorless phthalide dyes, fluorans, phenyl phenothiazines and leucauramines.

8. The process of claim 5 wherein the oil is selected from the group consisting of castor oil, linseed oil, tung oil and coconut oil.

9. A method for increasing the concentration of color reactive dye material which remains dissolved in a substantially water insoluble organic oil and does not separate to yield a dispersion of dye in the oil including the steps of:
   a. providing a heated solution of the color reactive dye in the oil at a temperature between 20° and 150° centigrade and at such a concentration that, at room temperature, the solution would not be stable;
   b. adding an organic peroxide compound to the solution,
   whereby, the peroxide reacts with the dye to yield a complex in stable solution.

10. The method of claim 9 wherein the color reactive dye material is selected from the group consisting of colorless phthalide dyes, fluorans, phenyl phenothiazines and leucauramines.

11. The method of claim 9 wherein the oil is selected from the group consisting of castor oil, linseed oil, tung oil and coconut oil.

* * * * *